United States Patent [19]

Iwanami et al.

[11] Patent Number: 4,487,789

[45] Date of Patent: Dec. 11, 1984

[54] PROCESS FOR FORMING FILM OF HYDROLYZED ETHYLENE-VINYL ACETATE COPOLYMER

[75] Inventors: Teruo Iwanami, Ibaraki; Kenji Hasegawa, Hirakata, both of Japan

[73] Assignee: Nippon Gohsei Kagaku Kogyo Kabushiki Kaisha, Osaka, Japan

[21] Appl. No.: 578,716

[22] Filed: Feb. 9, 1984

[30] Foreign Application Priority Data

Dec. 9, 1983 [JP] Japan ............................ 58-233265
Dec. 9, 1983 [JP] Japan ............................ 58-233266
Dec. 9, 1983 [JP] Japan ............................ 58-233267
Dec. 9, 1983 [JP] Japan ............................ 58-233268

[51] Int. Cl.³ .............................................. B05D 3/02
[52] U.S. Cl. ............................. 427/407.1; 427/385.5; 427/388.2; 427/391; 427/393.5; 427/409; 427/411; 427/412.2; 427/412.3; 427/412.5
[58] Field of Search ............... 427/385.5, 388.2, 393.5, 427/407.1, 409, 391, 411, 412.2, 412.3, 412.5; 215/DIG. 6, 12 A

[56] References Cited

U.S. PATENT DOCUMENTS 4,377,621 3/1983 Hart et al. ............. 427/388.2 X
4,379,188 4/1983 Zimmerman et al. ........ 427/389.7 X

*Primary Examiner*—Thurman K. Page
*Attorney, Agent, or Firm*—Armstrong, Nikaido, Marmelstein & Kubovcik

[57] ABSTRACT

A process for forming a film of hydrolyzed ethylene-vinyl acetate copolymer employing a mixed solvent of water, at least one member selected from the group consisting of propyl alcohol, butyl alcohol and benzyl alcohol, and at least one member selected from the group consisting of formic acid, an alkyl formate, acetic actid, an alkyl acetate, dimethylsulfoxide and N-methylpyrrolidone as a solvent for the copolymer.

A process includes an applying operation which can be carried out at normal temperature employing a solution in a low concentration of the copolymer.

Also, a process need not any additional operation or special devices to form an even and homogeneous film of the hydrolyzed ethylene-vinyl acetate copolymer having excellent properties such as transparency and gas impermeability suitable for wrapping or packaging material.

7 Claims, No Drawings

PROCESS FOR FORMING FILM OF HYDROLYZED ETHYLENE-VINYL ACETATE COPOLYMER

BACKGROUND OF THE INVENTION

The present invention relates to a process for forming a film of a hydrolysed ethylene-vinyl acetate copolymer.

A film of a hydrolysed ethylene-vinyl acetate copolymer having an ethylene content of 25 to 55% by mole and a degree of hydrolysis in the vinyl acetate component of at least 90% by mole has an excellent transparency and oxygen impermeability, and is useful as wrapping or packaging material for foods, medical supplies, industrial chemical reagents and the like. It is often used as composite material, e.g. a laminate with plastic film, paper, metal foil or the like.

Many processes can be employed for forming a film of the hydrolysed ethylene-vinyl acetate copolymer. In these processes, coating process in which a solution of the copolymer dissolved in a solvent is applied to a substrate is considered to be more effective on the point of the advantages that a thinner film can be formed, that a film can be easily formed on even a substrate of complicated shape such as a hollow container and that applying operation can be carried out by means of simpler and cheaper devices.

As to the coating process, there have been proposed many types of solvent for the copolymer. For example, water-containing propyl alcohol and water-containing butyl alcohol described in Japanese Examined Patent Publication (Tokkyo Kokoku) No. 23911/1971 and No. 48489/1972 are considered as good solvents in view of transparency of a film.

However, in case of employing such water-containing alcohol as a solvent, the applying operation must be carried out with keeping the solution at a high temperature of 50° C. to obtain a good transparent film. Also, the solution including such water-containing alcohol has defects that a storage stability is worse and the solution must be subjected to re-heating to dissolve the deposited products at a time of use.

Also, concentrations in the solution are apt to be changed due to the solvent evaporation. Therefore, the applying operation must be carried out in a closed system requiring a careful process control. Further, in an aspect of properties such as transparency and gas impermeability, a film prepared from the solution employing water-containing alcohols as a solvent does not always satisfy the requirements of quality which recently becomes strict more and more. Consequently, it is desired to produce a film of the hydrolysed ethylene-vinyl acetate copolymer which is further improved in the properties.

It is an object of the present invention to provide a process for forming a film of a hydrolysed ethylene-vinyl acetate copolymer having remarkably advanced transparency and gas impermeability, in which applying operation is carried out at a normal temperature without requiring any special device or complicated operation at a time of application.

These and other objects of the present invention will become apparent from the description hereinafter.

SUMMARY OF THE INVENTION

In accordance with the present invention, there is provided a process for forming a film of a hydrolysed ethylene-vinyl acetate copolymer which comprises applying a solution of the hydrolysed ethylene-vinyl acetate copolymer dissolved in a solvent to a substrate and drying the applied substrate, said copolymer having an ethylene content of 25 to 55% by mole and a degree of hydrolysis in the vinyl acetate component of at least 90% by mole, and said solvent consisting of (A) 10 to 60% by weight of water, (B) 5 to 70% by weight of at least one member selected from the group consisting of propyl alcohol, butyl alcohol and benzyl alcohol, and (C) 2 to 85% by weight of at least one member selected from the group consisting of formic acid, an alkyl formate, acetic acid, an alkyl acetate, dimethylsulfoxide and N-methylpyrrolidone.

DETAILED DESCRIPTION

According to the present invention, it is necessary to employ a hydrolysed ethylen-vinyl acetate copolymer having an ethylene content of 25 to 55% by mole, preferably 28 to 48% by mole and a degree of hydrolysis in the vinyl acetate component of at least 90% by mole, preferably at least 95% by mole. When the ethylene content is below 25% by mole, gas impermeability falls down at high humidity. On the other hand, when the ethylene content is over 55% by mole, the film becomes inferior in gas impermeability and printability. When the degree of hydrolysis is below 90% by mole, gas impermeability and water-resistance are lowered.

The copolymer used in the present invention may include a small amount of comonomers, e.g. α-olefins such as propylene, iso-butene, α-octene and α-octadecene; unsaturated carboxylic acids, their salts or partial or complete alkyl esters, nitrils, amides and anhydrides; and unsaturated sulfonic acids or salts thereof.

In the production of the solution of such a copolymer, there is employed a solvent consisting of (A) 10 to 60% by weight of water, (B) 5 to 70% by weight of at least one member selected from the group consisting of propyl alcohol, butyl alcohol and benzyl alcohol, and (C) 2 to 85% by weight of at least one member selected from the group consisting of formic acid, an alkyl formate, acetic acid, an alkyl acetate, dimethylsulfoxide and N-methylpyrrolidone.

Feature of the present invention consists in addition of a defined amount of (C) into a conventional used water/propyl alcohol or water/butyl alcohol solvent system. (C) components show outstanding effects which cannot be expected from the prior art in the combination with (A) and (B).

In the present solvent, a content of (A) must be in the range of 10 to 60% by weight, preferably 30 to 50% by weight. When the content is below 10% by weight, a homogeneous solution can hardly be obtained. On the other hand, when the content is over 60% by weight, solubility of the copolymer is remarkably lowered.

A content of (B) must be in the range of 5 to 70% by weight, preferably 40 to 60% by weight. When the content is below 5% by weight, the copolymer is hard to dissolve in the solvent unless a considerable amount of (C) should be employed. On the other hand, when the content is over 70% by weight, a homogeneous solution can hardly be obtained.

A content of (C) must be in the range of 2 to 85% by weight, preferably 5 to 40% by weight, more preferably 10 to 30% by weight. When the content is below 2% by weight, effects of addition of (C) can be hardly recognized. On the other hand, the use of (C) in an amount of over 85% by weight is not preferable, because formic acid or acetic acid corrodes the operational apparatus and dimethylsulfoxide or N-methylpyrrolidone necessitates a high temperature and long time in drying operation.

Examples of propyl alcohol in (B) are, for instance, n-propyl alcohol, iso-propyl alcohol and the like. Examples of butyl alcohol in (B) are, for instance, n-butyl alcohol, iso-butyl alcohol, sec-butyl alcohol, tert-butyl alcohol and the like. In these compounds, iso-propyl alcohol is preferably used. If (C) is mixed with alcohols other than (B), a good transparent film cannot be obtained. Formic acid and acetic acid are preferably used in (C) component.

With respect to formic acid and acetic acid in (C), any alkyl esters thereof such as methyl formate or acetate, ethyl formate or acetate, propyl formate or acetate can be used without any reduction of the effects of the present invention.

A concentration of the hydrolysed ethylene-vinyl acetate copolymer in the solution is not limited and a solution having any concentration can be adapted to the applying operation. Preferable concentration range is generally about 0.5 to about 15% by weight.

One of the features of the present invention consists in the fact that a cloudy film is not formed from even the solution which has a low concentration of the copolymer. In a conventional process employing water-containing alcohols as a solvent, a solution having a high concentration of the copolymer is applied to a substrate and thus, control of film thickness is difficult. According to the present invention, when a solution having a low concentration of the copolymer, e.g. about 3 to about 10% by weight, is employed, the effects of the present invention are remarkably distinguished. Since such a solution is superior in stability and there is no possibility that the copolymer will be precipitate in the solution, applying operation can be carried out at about a normal temperature. Such a solution is also superior in storage stability at a low temperature and therefore, any additional operation such as re-heating is not required at a time of application.

In the present invention, it is preferable to determine a formulation of the copolymer solution so as to have a viscosity of 3 to 100 cP in order to produce a film having uniform thickness easily.

Also, other polymers which can be dissolved in the solvent consisting of (A), (B) and (C), may be incorporated into the above-mentioned solution. The polymers as used in the present invention include, for instance, hydrolysed ethylene-vinyl acetate copolymer having an ethylene content of 75 to 90% by mole and a degree of hydrolysis of at least 90% by mole, polyamide, hydrolysed polyvinyl acetate and the like.

According to the present invention, kind of a substrate to which the copolymer solution is applied is not limited. Examples of the substrate are, for instance, film, sheet and hollow container of plastics such as polyethylene, polypropylene, polyester, polystyrene or polyvinylchloride; paper; cellophane; cellulose acetate; natural rubber; synthetic rubber; metal and the like. Suitable thickness of such a substrate is about 10 to about 1000 μm.

A substrate on which the copolymer film is formed by a process of the present invention is generally employed as wrapping or packaging material as it is. If necessary, a formed film is peeled off from a substrate and the obtained film or sheet may be used as wrapping or packaging material.

Applying method employable in the present invention is any known method such as roller coating method, spray coating method or dip coating method.

In the present invention, for a purpose of increasing adhesive strength between a substrate and the copolymer film, a substrate may be subjected to oxidizing treatment, flaming treatment, anchor coating treatment or primer treatment according to a kind of substrate.

In the anchor coating treatment, polyurethane compounds or polyisocyanate-containing polyester compounds can be preferably used for forming anchor coating layer. Thickness of the anchor coating layer is preferably about 0.05 to about 3 μm for practical use.

Drying operation is carried out after the copolymer solution is applied to a substrate. Drying operation is carried out by heating the copolymer film at a drying temperature of about 30° to about 200° C., preferably about 30° to about 150° C. for about 3 sec to about 10 min of drying time. Particularly, when demethylsulfoxide and N-methylpyrrolidone are used as (C), the drying temperature is preferably about 60° to about 150° C. On the other hand, when formic acid, acetic acid and the like are used as (C), the drying temperature is preferably about 50° to about 120° C. During such drying operation, volatile ingredients, i.e. a solvent of (A), (B) and (C) are removed from the applied film. Though a boiling point of (A) and (C) is considerable high, the above-mentioned drying temperature is enough to dry film because coexisting (B) promotes the evaporation of (A) and (C).

Drying operation should be continued until almost all the volatile ingredients are removed. Also, drying operation may be stopped when a content of the volatile ingredients falls down to 0.01 to 10% by weight in the film.

Thickness of the film of a hydrolysed ethylene-vinyl acetate copolymer is preferably about 0.5 to about 10 μm for practical use. When the thickness is below 0.5 μm, gas impermeability cannot be obtained sufficiently. On the other hand, when the thickness is over 10 μm, it is difficult to control the thickness of film.

If necessary, a water-proof film of vinylidene chloride resin, vinyl chloride-vinyl acetate copolymer or the like may also be formed on the copolymer film.

A film or sheet of the hydrolysed ethylene-vinyl acetate copolymer formed by a process of the present invention are useful as wrapping or packaging material or container for foods, drinks, chemicals, drugs or the like.

Wrapping or packaging material or container may be in any shape such as film, sheet, hollow container, bottle or tube. The practical composite material typically consists of substrate of polyester, polyethylene or the like having a thickness of 10 to 1000 μm, anchor coat layer having a thickness of 0.05 to 3 μm provided on the substrate, film of the hydrolysed ethylene-vinyl acetate copolymer having a thickness of 0.5 to 10 μm provided on the anchor coat layer and, if necessary, film of vinylidene chloride resin or vinyl chloride-vinyl acetate copolymer having a thickness of about 0.5 to about 3 μm provided on the film of copolymer.

When substrate is a hollow container, thickness of the copolymer film preferably satisfies the following equations (1) and (2):

$$D_2/D_1 = 0.8 \text{ to } 1.3 \tag{1}$$

$$(D_1+D_2)/2=0.5 \text{ to } 10 \quad (2)$$

wherein $D_1$ is a thickness (μm) of the copolymer film at a position of ⅔ in height of the coated area from the bottom thereof and $D_2$ is a thickness (μm) of the coated area at a position of ⅓ in height of the coated area from the bottom thereof.

Such a hollow container has a film having extremely uniform thickness and does not show partly uneven transparency and gas impermeability. Thus, the container is superior in, particularly gas impermeability and curved surface printability.

A hollow container having a film of such a uniform thickness can be easily produced by dipping a hollow container in a solution of the hydrolysed ethylene-vinyl acetate copolymer having a viscosity of 3 to 100 cP, preferably 5 to 80 cP and drying it.

The present invention is more specifically described and explained by means of the following Examples and Comparative Examples in which all parts and percentages are by weight unless otherwise noted. It is to be understood that the present invention is not limited to the Examples, and various changes and modifications may be made in the invention without departing from the spirit and scope thereof.

EXAMPLE 1

Into a vessel were added 95 parts of a solvent consisting of 30% of water, 50% of iso-propyl alcohol and 20% of formic acid, and 5 parts of a hydrolysed ethylene-vinyl acetate copolymer having an ethylene content of 36% by mole and a degree of hydrolysis of 99.5% by mole. The mixture was stirred at a temperature of 40° to 50° C. for about one hour to give a transparent solution of the copolymer.

A substrate of polyethylene terephthalate film having a thickness of 50 μm was subjected to anchor coating treatment employing a solution of polyurethane compound consisting of 100 parts of polyurethane adhesive, 6.5 parts of curing agent and 900 parts of ethyl acetate to give an anchor coating layer of polyurethane compound having a thickness of 3 μm.

Thus treated substrate was dipped into a solution prepared as above at a temperature of 25° C. Immediately after taking out of the solution, the film was dried at 70° C. for 2 min, thereby a film of the hydrolysed ethylene-vinyl acetate copolymer having a thickness of 5 μm was formed.

Transparency of thus obtained coated substrate was measured according to ASTM D1003-52. The coated substrate had an excellent transparency of 13% of a haze value. A haze value of the original substrate was 14%.

Oxygen impermeability of the coated substrate was measured according to ASTM D1434-58. The coated substrate had an excellent gas impermeability that a rate of oxygen permeation is 7 cc (NTP)/m$^2$·24 hr·atm.

Interlaminar adhesive strength was also measured. Adhesive strength was found to be over 300 g/25 mm showing extremely good results.

When the coated substrate was stored for 10 days under a circumstance of 65% RH and 20° C., cracks and reduction of transparency were not observed, and appearance of the coated substrate and interlaminar adhesive strength were scarecely changed.

COMPARATIVE EXAMPLE 1

The procedure of Example 1 was repeated except that formic acid was not employed.

With respect to the obtained coated substrate, both transparency and oxygen impermeability were lowered to a level that 85% of a haze value and 45 cc (NTP)/m$^2$·24 hr·atm of a rate of oxygen permeation, respectively.

In case of elevating the solution temperature up to 60° C. during applying operation, a haze value was changed to 55% and a rate of oxygen permeation to 40 cc (NTP)/m$^2$·24 hr·atm.

COMPARATIVE EXAMPLES 2 AND 3

The procedure of Example 1 was repeated except that ethylenediamine was employed instead of formic acid (Comparative Example 2), or that ethyl alcohol was employed instead of iso-propyl alcohol (Comparative Example 3).

With respect to the obtained coated substrate of Comparative Example 2 and Comparative Example 3, a haze value were 80% and 35% and a rate of oxygen permeation were 41 cc (NTP)/m$^2$·24 hr·atm and 43 cc (NTP)/m$^2$·24 hr·atm, respectively.

EXAMPLES 2 TO 8 AND COMPARATIVE EXAMPLES 4 TO 9

A copolymer film was formed employing a solution shown in Table 1 or 2 under a condition shown in Table 1 or 2 by the procedure as similar to Example 1.

Characteristic properties of the obtained coated substrate are shown in Table 1 or 2.

As to Examples 7 and 8, further on a film of the hydrolysed ethylene-vinyl acetate copolymer was provided a layer having a thickness of 2 μm of vinylidene chloride resin and vinyl chloride-vinyl acetate copolymer, respectively.

Rate of oxygen permeation of used substrates are as follows:
[cc (NTP)/m$^2$·24 hr·atm]
OPP (biaxially oriented polypropylene) film (60 μm); 800
LDPE (low density polyethylene) film (35 μm); 2100
PET (polyethylene terephthalate) bottle (300 μm); 5.5
PVC (polyvinylchloride) bottle (400 μm); 8.6
PP (polypropylene) bottle (500 μm); 205

With respect to Examples 4 to 8 and Comparative Examples 8 and 9, adhesive strength was evaluated by dropping the coated bottle which is filled with water from a height of 0.5 m to concrete ground.

TABLE 1

| | Substrate | | Anchor coating layer | | Hydrolysed ethylene-vinyl acetate copolymer | | |
|---|---|---|---|---|---|---|---|
| | Kind | Thickness (μm) | Kind | Thickness (μm) | Ethylene content (% by mole) | Degree of hydrolysis (% by mole) | Thickness (μm) |
| Ex. 2 | OPP film | 60 | polyurethanes | 2 | 36 | 99.5 | 6 |

TABLE 1-continued

| | | Thickness (μm) | Anchor coating kind | Thickness (μm) | Ethylene content (% by mole) | Degree of hydrolysis (% by mole) | Thickness (μm) |
|---|---|---|---|---|---|---|---|
| Ex. 3 | LDPE film | 35 | polyurethanes | 2 | 28 | 98.3 | 3 |
| Ex. 4 | PET bottle | 300 | polyurethanes | 1 | 36 | 99.5 | 3 |
| Ex. 5 | PET bottle | 300 | polyurethanes | 1 | 36 | 99.5 | 3 |
| Ex. 6 | PET bottle | 300 | polyesters | 2 | 36 | 99.6 | 2 |
| Ex. 7 | PVC bottle | 400 | polyurethanes | 2 | 41 | 98.9 | 3 |
| Ex. 8 | PP bottle | 500 | polyurethanes | 2 | 36 | 99.6 | 5 |

| | Solvent | | | (C) Formic acid (%) | Concentration of the copolymer in the solution (%) | Application means | Temperature of the solution during application (°C.) | Drying operation | |
|---|---|---|---|---|---|---|---|---|---|
| | (A) Water (%) | (B) Kind of alcohol | (%) | | | | | Temperature (°C.) | Time (min) |
| Ex. 2 | 40 | n-Propyl alcohol | 40 | 20 | 8 | Roll coating | 20 | 100 | 0.5 |
| Ex. 3 | 35 | iso-Propyl alcohol | 60 | 5 | 2 | Spray coating | 20 | 70 | 1 |
| Ex. 4 | 30 | n-Propyl alcohol | 55 | 15 | 5 | Dip coating | 25 | 70 | 1 |
| Ex. 5 | 30 | tert-Butyl alcohol | 60 | 10 | 5 | Dip coating | 30 | 80 | 3 |
| Ex. 6 | 20 | Benzyl alcohol | 25 | 55 | 3 | Dip coating | 40 | 100 | 5 |
| Ex. 7 | 25 | n-Propyl alcohol | 65 | 10 | 3 | Dip coating | 20 | 70 | 2 |
| Ex. 8 | 30 | iso-Propyl alcohol | 50 | 20 | 3 | Dip coating | 20 | 70 | 2 |

| | Transparency | Rate of oxygen permeation (cc/m² · 24 hr · atm) | Interlaminer adhesive strength | Change in appearance | |
|---|---|---|---|---|---|
| | | | | Transparency | Cracking |
| Ex. 2 | 3* | 8 | good | No | No |
| Ex. 3 | 15* | 15 | good | No | No |
| Ex. 4 | very good | 1.3 | good | No | No |
| Ex. 5 | very good | 1.2 | good | No | No |
| Ex. 6 | very good | 2.1 | good | No | No |
| Ex. 7 | very good | 3.0 | good | No | No |
| Ex. 8 | very good | 6.0 | good | No | No |

*haze value (%)

TABLE 2

| | Substrate | | Anchor coating layer | | Hydrolysed ethylene-vinyl acetate copolymer | | |
|---|---|---|---|---|---|---|---|
| | Kind | Thickness (μm) | Kind | Thickness (μm) | Ethylene content (% by mole) | Degree of hydrolysis (% by mole) | Thickness (μm) |
| Com. Ex. 4 | PET film | 100 | polyesters | 1.5 | 36 | 99.6 | — |
| Com. Ex. 5 | PET film | 50 | polyesters | 1.5 | 36 | 99.6 | — |
| Com. Ex. 6 | LDPE film | 35 | polyurethanes | 2 | 28 | 98.3 | — |
| Com. Ex. 7 | LDPE film | 35 | polyurethanes | 2 | 28 | 98.3 | — |
| Com. Ex. 8 | PET bottle | 300 | polyurethanes | 2 | 36 | 99.6 | 4 |
| Com. Ex. 9 | PP bottle | 500 | polyurethanes | 2 | 36 | 99.6 | 8 |

| | Solvent | | | (C) Formic acid (%) | Concentration of the copolymer in the solution (%) | Application means | Temperature of the solution during application (°C.) | Drying operation | |
|---|---|---|---|---|---|---|---|---|---|
| | (A) Water (%) | (B) Kind of alcohol | (%) | | | | | Temperature (°C.) | Time (min) |
| Com. Ex. 4 | 5 | iso-Propyl alcohol | 65 | 30 | 5 | Homogeneous solution could not be prepared. | | | |
| Com. Ex. 5 | 70 | iso-Propyl alcohol | 10 | 20 | 8 | Homogeneous solution could not be prepared. | | | |
| Com. Ex. 6 | 28 | n-Propyl alcohol | 2 | 70 | 8 | Homogeneous solution could not be prepared. | | | |
| Com. Ex. 7 | 15 | n-Propyl alcohol | 80 | 5 | 5 | Homogeneous solution could not be prepared. | | | |
| Com. Ex. 8 | 40 | iso-Propyl alcohol | 59 | 1 | 5 | Dip coating | 20 | 80 | 2 |
| Com. Ex. 9 | 5 | n-Propanol alcohol | 5 | 90 | 10 | Dip coating | 25 | 70 | 3 |

| | Transparency | Rate of oxygen permeation (cc/m² · 24 hr · atm) | Interlaminer adhesive strength | Change in appearance | |
|---|---|---|---|---|---|
| | | | | Transparency | Cracking |

TABLE 2-continued

| | | | | | |
|---|---|---|---|---|---|
| Com. Ex. 4 | — | — | — | — | — |
| Com. Ex. 5 | — | — | — | — | — |
| Com. Ex. 6 | — | — | — | — | — |
| Com. Ex. 7 | — | — | — | — | — |
| Com. Ex. 8 | clouded | 5.3 | delaminated | clouded | — |
| Com. Ex. 9 | good | 21 | good | — | Yes |

EXAMPLE 9

Into a vessel were added 94 parts of a solvent consisting of 40% of water, 50% of iso-propyl alcohol and 10% of acetic acid, and 6 parts of a hydrolysed ethylene-vinyl acetate copolymer having an ethylene content of 36% by mole and a degree of hydrolysis of 99.5% by mole. The mixture was stirred at a temperature of 40° to 50° C. for about one hour to give a transparent solution of the copolymer.

A substrate of polyethylene terephthalate film having a thickness of 50 μm was subjected to anchor coating treatment employing a solution of polyurethane compound consisting of 100 parts of polyurethane adhesive, 6.5 parts of curing agent and 900 parts of ethyl acetate to give an anchor coating layer of polyurethane compound having a thickness of 3 μm.

Thus treated substrate was dipped into a solution prepared as above at a temperature of 25° C. Immediately after taking out of the solution, the film was dried at 80° C. for 3 min, thereby a film of the hydrolysed ethylene-vinyl acetate copolymer having a thickness of 6 μm was formed.

The coated substrate had an excellent transparency of 13% of a haze value. A haze value of the original substrate was 14%.

The coated substrate had an excellent gas impermeability that a rate of oxygen permeation is 6 cc (NTP)/m$^2$·24 hr·atm.

Interlaminar adhesive strength was found to be over 300 g/25 mm showing extremely good results.

When the coated substrate was stored for 10 days under a circumstance of 65% RH and 20° C., cracks and reduction of transparency were not observed, and appearance of the coated substrate and interlaminar adhesive strength were scarecely changed.

COMPARATIVE EXAMPLE 10

The procedure of Example 9 was repeated except that acetic acid was not employed.

With respect to the obtained coated substrate, both transparency and oxygen impermeability were lowered to a level that 80% of a haze value and 43 cc (NTP)/m$^2$·24 hr·atm of a rate of oxygen permeation, respectively.

In case of elevating the solution temperature up to 60° C. during applying operation, a haze value was changed to 53% and a rate of oxygen permeation to 38 cc (NTP)/m$^2$·24 hr·atm.

COMPARATIVE EXAMPLES 11 AND 12

The procedure of Example 9 was repeated except that ethylenediamine was employed instead of acetic acid (Comparative Example 11), or that ethyl alcohol was employed instead of iso-propyl alcohol (Comparative Example 12).

With respect to the obtained coated substrate of Comparative Example 11 and Comparative Example 12, a haze value 78% and 31% and a rate of oxygen permeation were 38 cc (NTP)/m$^2$·24 hr·atm and 40 cc (NTP)/m$^2$·24 hr·atm, respectively.

EXAMPLES 10 TO 14 AND COMPARATIVE EXAMPLES 13 TO 18

A copolymer film was formed employing a solution shown in Table 3 or 4 under a condition shown in Table 3 or 4 by the procedure as similar to Example 9.

Characteristic properties of the obtained coated substrate were shown in Table 3 or 4.

As to Examples 14, further on a film of the hydrolysed ethylene-vinyl acetate copolymer was provided a layer having a thickness of 2 μm of vinylidene chloride resin.

With respect to Examples 12 to 14 and Comparative Examples 17 and 18 adhesive strength was evaluated by dropping the coated bottle which is filled with water from a height of 0.5 m to concrete ground.

TABLE 3

| | Substrate | | Anchor coating layer | | Hydrolysed ethylene-vinyl acetate copolymer | | |
|---|---|---|---|---|---|---|---|
| | | | | | Ethylene | Degree of | |
| | Kind | Thickness (μm) | Kind | Thickness (μm) | content (% by mole) | hydrolysis (% by mole) | Thickness (μm) |
| Ex. 10 | LDPE film | 35 | polyurethanes | 1 | 36 | 99.5 | 6 |
| Ex. 11 | OPP film | 60 | polyurethanes | 2 | 36 | 99.6 | 2 |
| Ex. 12 | PET bottle | 300 | polyurethanes | 2 | 28 | 98.3 | 4 |
| Ex. 13 | PET bottle | 300 | polyurethanes | 2 | 41 | 98.9 | 4 |
| Ex. 14 | PP bottle | 500 | polyesters | 2 | 36 | 99.6 | 2 |

| | Solvent | | | Concentration of the copolymer in the solution (%) | Application means | Temperature of the solution during application (°C.) | Drying operation | |
|---|---|---|---|---|---|---|---|---|
| | (A) Water (%) | (B) Kind of alcohol | (%) | (C) Acetic acid (%) | | | | Temperature (°C.) | Time (min) |
| Ex. 10 | 35 | iso-Propyl alcohol | 50 | 15 | 5 | Roll coating | 25 | 80 | 3 |
| Ex. 11 | 25 | Benzyl alcohol | 25 | 50 | 3 | Spray coating | 40 | 100 | 4 |
| Ex. 12 | 35 | iso-Propyl | 45 | 20 | 5 | Dip | 20 | 100 | 0.5 |

TABLE 3-continued

| | | alcohol | | | | coating | | | |
|---|---|---|---|---|---|---|---|---|---|
| Ex. 13 | 30 | tert-Butyl alcohol | 55 | 15 | 5 | Dip coating | 20 | 70 | 2 |
| Ex. 14 | 40 | n-Propyl alcohol | 50 | 10 | 7 | Dip coating | 25 | 80 | 1 |

| | Transparency | Rate of oxygen permeation (cc/m² · 24 hr · atm) | Interlaminer adhesive strength | Change in appearance | |
|---|---|---|---|---|---|
| | | | | Transparency | Cracking |
| Ex. 10 | 14* | 7 | good | No | No |
| Ex. 11 | 4* | 18 | good | No | No |
| Ex. 12 | very good | 1.4 | good | No | No |
| Ex. 13 | very good | 1.5 | good | No | No |
| Ex. 14 | very good | 8.5 | good | No | No |

*have value (%)

TABLE 4

| | Substrate | | Anchor Coating layer | | Hydrolysed ethylene-vinyl acetate copolymer | | |
|---|---|---|---|---|---|---|---|
| | Kind | Thickness (μm) | Kind | Thickness (μm) | Ethylene content (% by mole) | Degree of hydrolysis (% by mole) | Thickness (μm) |
| Com. Ex. 13 | PET bottle | 300 | polyesters | 2 | 28 | 98.3 | — |
| Com. Ex. 14 | PET film | 50 | polyesters | 2 | 36 | 99.6 | — |
| Com. Ex. 15 | OPP film | 60 | polyurethanes | 2 | 28 | 98.3 | — |
| Com. Ex. 16 | LDPE film | 35 | polyurethanes | 2 | 36 | 99.6 | — |
| Com. Ex. 17 | PET bottle | 300 | polyurethanes | 1.5 | 36 | 99.6 | 5 |
| Com. Ex. 18 | PP bottle | 500 | polyurethanes | 1.5 | 36 | 99.6 | 3 |

| | Solvent | | | Concentration of the copolymer in the solution (%) | Application means | Temperature of the solution during application (°C.) | Drying operation | |
|---|---|---|---|---|---|---|---|---|
| | (A) Water (%) | (B) Kind of alcohol | (%) | (C) Acetic acid (%) | | | | Temperature (°C.) | Time (min) |
| Com. Ex. 13 | 5 | iso-Propyl alcohol | 60 | 35 | 7 | Homogeneous solution could not be prepared | | | |
| Com. Ex. 14 | 70 | iso-Propyl alcohol | 15 | 15 | 5 | Homogeneous solution could not be prepared | | | |
| Com. Ex. 15 | 38 | iso-Propyl alcohol | 2 | 60 | 5 | Homogeneous solution could not be prepared | | | |
| Com. Ex. 16 | 15 | n-Propyl alcohol | 80 | 5 | 8 | Homogeneous solution could not be prepared | | | |
| Com. Ex. 17 | 40 | iso-Propyl alcohol | 58 | 2 | 8 | Dip coating | 20 | 70 | 4 |
| Com. Ex. 18 | 5 | n-Propyl alcohol | 5 | 90 | 5 | Dip coating | 25 | 80 | 3 |

| | Transparency | Rate of oxygen permeation (cc/m² · 24 hr · atm) | Interlaminer adhesive strength | Change in appearance | |
|---|---|---|---|---|---|
| | | | | Transparency | Cracking |
| Com. Ex. 13 | — | — | — | — | — |
| Com. Ex. 14 | — | — | — | — | — |
| Com. Ex. 15 | — | — | — | — | — |
| Com. Ex. 16 | — | — | — | — | — |
| Com. Ex. 17 | clouded | 5.3 | delaminated | clouded | — |
| Com. Ex. 18 | good | 55 | good | — | Yes |

EXAMPLE 15

Into a vessel were added 95 parts of a solvent consisting of 30% of water, 60% of iso-propyl alcohol and 10% of N-methylpyrrolidone, and 5 parts of a hydrolysed ethylene-vinyl acetate copolymer having an ethylene content of 36% by mole and a degree of hydrolysis of 99.5% by mole. The mixture was stirred at a temperature of 40° to 50° C. for about one hour to give a transparent solution of the copolymer.

A substrate of polyethylene terephthalate film having a thickness of 50 μm was subjected to anchor coating treatment employing a solution of polyurethane compound consisting of 100 parts of polyurethane adhesive, 6.5 parts of curing agent and 1100 parts of ethyl acetate to give an anchor coating layer of polyurethane compound having a thickness of 2 μm.

Thus treated substrate was dipped into a solution prepared as above at a temperature of 25° C. Immediately after taking out of the solution, the film was dried at 90° C. for 3 min, thereby a film of the hydrolysed ethylene-vinyl acetate copolymer having a thickness of 6 μm was formed.

The coated substrate had an excellent transparency of 15% of a haze value. A haze value of the original substrate was 14%.

The coated substrate had an excellent gas impermeability that a rate of oxygen permeation is 8 cc (NTP)/m$^2$·24 hr·atm.

Interlaminar adhesive strength shows extremely good results.

When the coated substrate was stored for 10 days under a circumstance of 65% RH and 20° C., crackings and reduction of transparency were not observed, and appearance of the coated substrate and interlaminar adhesive strength were scarecely changed.

COMPARATIVE EXAMPLE 19

The procedure of Example 15 was repeated except that N-methylpyrrolidone was not employed.

With respect to the obtained coated substrate, both transparency and oxygen impermeability were lowered to a level that 82% of a haze value and 42 cc (NTP)/m$^2$·24 hr·atm of a rate of oxygen permeation, respectively.

COMPARATIVE EXAMPLES 20 and 21

The procedure of Example 15 was repeated except that ethylenediamine was employed instead of N-methylprrolidone (Comparative Example 20), or that ethyl alcohol was employed instead of iso-propyl alcohol (Comparative Example 21).

With respect to the obtained coated substrate of Comparative Example 20 and Comparative Example 21, a haze value were 75% and 38%, and a rate of oxygen permeation were 42 cc (NTP)/m$^2$·24 hr·atm and 43 cc (NTP)/m$^2$·24 hr·atm, respectively.

EXAMPLES 16 to 20 AND COMPARATIVE EXAMPLES 22 to 27

A copolymer film was formed employing a solution shown in Table 5 or 6 under a condition shown in Table 5 or 6 by the procedure as similar to Example 15.

Characteristic properties of the obtained coated substrate were shown in Table 5 or 6.

As to Example 20, further on a film of the hydrolysed ethylene-vinyl acetate copolymer was provided a layer having a thickness of 2 μm of vinylidene chloride resin.

With respect to Examples 17 to 20 and Comparative Examples 26 and 27, adhesive strength was evaluated by dropping the coated bottle which is filled with water from a height of 0.5 m to concrete ground.

TABLE 5

| | Substrate | | Anchor coating layer | | Hydrolysed ethylene-vinyl acetate copolymer | | |
|---|---|---|---|---|---|---|---|
| | Kind | Thickness (μm) | Kind | Thickness (μm) | Ethylene content (% by mole) | Degree of hydrolysis (% by mole) | Thickness (μm) |
| Ex. 16 | LDPE film | 35 | polyurethanes | 1.5 | 41 | 98.9 | 3 |
| Ex. 17 | PET bottle | 300 | polyurethanes | 1 | 36 | 99.5 | 2 |
| Ex. 18 | PET bottle | 300 | polyurethanes | 2 | 36 | 99.5 | 4 |
| Ex. 19 | PVC bottle | 400 | polyesters | 2 | 28 | 98.3 | 6 |
| Ex. 20 | PP bottle | 500 | polyesters | 2 | 36 | 99.5 | 2 |

| | Solvent | | | | Concentration of the copolymer in the solution (%) | Appli- cation means | Temperature of the solution during appli- cation (°C.) | Drying operation | |
|---|---|---|---|---|---|---|---|---|---|
| | (A) Water (%) | (B) Kind of alcohol | (%) | (C) (%) | | | | Temperature (°C.) | Time (min) |
| Ex. 16 | 40 | iso-Propyl alcohol | 55 | DMSO* 5 | 4 | Roll coating | 30 | 80 | 3 |
| Ex. 17 | 40 | iso-Propyl alcohol | 50 | DMSO* 10 | 5 | Dip coating | 30 | 80 | 1 |
| Ex. 18 | 35 | tert-Butyl alcohol | 50 | NMP** 15 | 6 | Dip coating | 25 | 85 | 2 |
| Ex. 19 | 35 | n-Propyl alcohol | 55 | NMP** 10 | 8 | Dip coating | 25 | 75 | 4 |
| Ex. 20 | 25 | Benzyl alcohol | 25 | NMP** 50 | 2 | Dip coating | 40 | 110 | 5 |

*dimethylsulfoxide
**N—methylpyrrolidone

| | Transparency | Rate of oxygen permeation (cc/m$^2$ · 24 hr · atm) | Interlaminer adhesive strength | Change in appearance | |
|---|---|---|---|---|---|
| | | | | Transparency | Cracking |
| Ex. 16 | 14* | 22 | good | No | No |
| Ex. 17 | very good | 1.7 | good | No | No |
| Ex. 18 | very good | 1.5 | good | No | No |
| Ex. 19 | very good | 2.3 | good | No | No |
| Ex. 20 | very good | 25 | good | No | No |

*haze value (%)

TABLE 6

| Substrate | Anchor coating layer | Hydrolysed ethylene-vinyl acetate copolymer |
|---|---|---|
| | | Degree of |

TABLE 6-continued

| | Kind | Thickness (μm) | Kind | Thickness (μm) | Ethylene content (% by mole) | hydrolysis (% by mole) | Thickness (μm) |
|---|---|---|---|---|---|---|---|
| Com. Ex. 22 | PET bottle | 300 | polyesters | 2 | 28 | 98.3 | — |
| Com. Ex. 23 | LDPE film | 35 | polyesters | 2 | 28 | 98.3 | — |
| Com. Ex. 24 | OPP film | 60 | polyurethanes | 1 | 28 | 98.3 | — |
| Com. Ex. 25 | LDPE film | 35 | polyurethanes | 1 | 36 | 99.6 | — |
| Com. Ex. 26 | PP bottle | 500 | polyurethanes | 1.5 | 36 | 99.6 | 5 |
| Com. Ex. 27 | PET bottle | 300 | polyurethanes | 1 | 36 | 99.6 | 8 |

| | Solvent | | | | Concentration of the copolymer in the solution (%) | Application means | Temperature of the solution during application (°C.) | Drying operation | |
|---|---|---|---|---|---|---|---|---|---|
| | (A) Water (%) | (B) Kind of alcohol | (%) | (C) (%) | | | | Temperature (°C.) | Time (min) |
| Com. Ex. 22 | 5 | n-Propyl alcohol | 60 | NMP** 35 | 7 | Homogeneous solution could not be prepared. | | | |
| Com. Ex. 23 | 70 | n-Propyl alcohol | 10 | DMSO* 20 | 5 | Homogeneous solution could not be prepared. | | | |
| Com. Ex. 24 | 27 | tert-Butyl alcohol | 3 | NMP** 70 | 5 | Homogeneous solution could not be prepared. | | | |
| Com. Ex. 25 | 10 | tert-Butyl alcohol | 80 | DMSO* 10 | 10 | Homogeneous solution could not be prepared. | | | |
| Com. Ex. 26 | 40 | iso-Propyl alcohol | 59 | NMP** 1 | 5 | Dip coating | 25 | 90 | 2 |
| Com. Ex. 27 | 5 | n-Propyl alcohol | 5 | NMP** 90 | 8 | Dip coating | 25 | 75 | 3 |

*dimethylsulfoxide
**N—methylpyrrolidone

| | Transparency | Rate of oxygen permeation (cc/m² · 24 hr · atm) | Interlaminar adhesive strength | Change in appearance | |
|---|---|---|---|---|---|
| | | | | Transparency | Cracking |
| Com. Ex. 22 | — | — | — | — | — |
| Com. Ex. 23 | — | — | — | — | — |
| Com. Ex. 24 | — | — | — | — | — |
| Com. Ex. 25 | — | — | — | — | — |
| Com. Ex. 26 | clouded | 185 | delaminated | clouded | — |
| Com. Ex. 27 | good | 2.1 | good | — | Yes |

EXAMPLE 21

Into a vessel were added 92 parts of a solvent consisting of 30% of water, 55% of iso-propyl alcohol and 15% of formic acid, and 8 parts of a hydrolysed ethylene-vinyl acetate copolymer having an ethylene content of 36% by mole and a degree of hydrolysis of 99.5% by mole. The mixture was stirred at a temperature of 50° to 60° C. for about one hour to give a transparent solution of the copolymer.

A hollow bottle of polyethylene terephthalate having a wall thickness of 300 μm and a volume of 1000 cc was subjected to anchor coating treatment employing a solution of polyurethane compound consisting of 100 parts of polyurethane adhesive, 6.5 parts of curing agent and 850 parts of ethyl acetate to give an anchor coating layer of polyurethane compound having a thickness of 2 μm.

Thus treated bottle was dipped into a solution prepared as above at a temperature of 25° C. and a viscosity of 60 cP. Immediately after taking out of the solution, the bottle was dried at 80° C. for 2 min, thereby a film of the hydrolysed ethylene-vinyl acetate copolymer having a thickness was formed. The obtained film had $D_1$ value of 5.5 μm and $D_2$ value of 6 μm, and was even and uniform.

The coated bottle had an excellent transparency.

The bottle had an excellent gas impermeability that a rate of oxygen permeation is 1.5 cc (NTP)/m²·24 hr·atm.

Interlaminar adhesive strength was also measured by dropping the coated hollow bottle which was filled with water from a height of 0.5 m to concrete ground. As a result of such a test, delamination was not observed at all.

When the coated bottle was stored for 10 days under a circumstance of 65% RH and 20° C., cracks and reduction of transparency were not observed, and appearance of the coated substrate and interlaminar adhesive strength were scarecely changed.

EXAMPLES 22 TO 23 AND COMPARATIVE EXAMPLE 28

The procedure of Example 21 was repeated except that a solution having a viscosity of 2 cP (Example 22) or 150 cP (Example 23), each prepared by varying a copolymer concentration, was employed instead of that having a viscosity of 60 cP.

With respect to the coated hollow bottle of Example 22, both $D_1$ and $D_2$ were 0.5 μm, and gas impermeability was not improved remarkably. With respect to the coated bottle of Example 23, $D_1$ and $D_2$ were 3 μm and 6 μm, respectively. A rate of oxygen permeation was 4.5 cc (NPT)/m²·24 hr·atm.

Also, the procedure of Example 21 was repeated except that ethyl alcohol was employed instead of isopropyl alcohol (Comparative Example 28). Obtained coated hollow container was clouded and cracks was observed apparently.

chloride and vinyl chloride-vinyl acetate copolymer, respectively.

Rate of oxygen permeation of used substrates are as follows:

[cc (NTP)/m²·24 hr·atm]

PET (polyethylene terephthalate) hollow bottle (300 μm); 5.5

PVC (polyvinylchloride) hollow bottle (400 μm); 8.6

PP (polypropylene) hollow botlle (500 μm); 205

HDPE (high density polyethylene) hollow bottle (500 μm); 160.

TABLE 7

| | Substrate | | Anchor coating layer | | Hydrolysed ethylene-vinyl acetate copolymer | | | |
|---|---|---|---|---|---|---|---|---|
| | | | | | Ethylene content | Degree of hydrolysis | Thickness (μm) | |
| | Kind | Thickness (μm) | Kind | Thickness (μm) | (% by mole) | (% by mole) | $D_1$ | $D_2$ |
| Ex. 24 | PET | 300 | polyesters | 1.5 | 41 | 98.9 | 2.5 | 3 |
| Ex. 25 | PET | 300 | polyesters | 1.5 | 28 | 98.3 | 5.5 | 6 |
| Ex. 26 | PP | 500 | polyurethanes | 2 | 28 | 98.3 | 2 | 2 |
| Ex. 27 | PVC | 400 | polyurethanes | 2 | 36 | 99.5 | 3 | 3 |
| Ex. 28 | PP | 500 | polyurethanes | 2 | 36 | 99.5 | 3 | 3 |
| Ex. 29 | PP | 500 | polyurethanes | 2 | 28 | 98.3 | 2 | 2 |
| Ex. 30 | HDPE | 500 | polyurethanes | 1.5 | 36 | 99.5 | 3.5 | 3.5 |

| | Solvent | | | | Concentration of the copolymer in the solution (%) | Application means | Temperature of the solution during application (°C.) | Drying operation | |
|---|---|---|---|---|---|---|---|---|---|
| | (A) Water (%) | (B) Kind of alcohol | (%) | (C) | | | | Temperature (°C.) | Time (min) |
| | | | | (%) | | | | | |
| Ex. 24 | 45 | n-Propyl alcohol | 40 | formic acid | 5 | Dip coating | 20 | 80 | 1 |
| | | | | 15 | | | | | |
| Ex. 25 | 50 | iso-Propyl alcohol | 40 | acetic acid | 8 | Dip coating | 20 | 60 | 4 |
| | | | | 10 | | | | | |
| Ex. 26 | 40 | n-Propyl alcohol | 50 | NMP** | 3 | Dip coating | 30 | 90 | 3 |
| | | | | 10 | | | | | |
| Ex. 27 | 30 | tert-Butyl alcohol | 55 | acetic acid | 5 | Dip coating | 25 | 60 | 3 |
| | | | | 15 | | | | | |
| Ex. 28 | 20 | Benzyl alcohol | 20 | formic acid | 4 | Dip coating | 40 | 100 | 5 |
| | | | | 60 | | | | | |
| Ex. 29 | 40 | n-Propyl alcohol | 40 | DMSO* | 0.9 | Dip coating | 30 | 90 | 3 |
| | | | | 20 | | | | | |
| Ex. 30 | 40 | iso-Propyl alcohol | 50 | formic acid | 5 | Dip coating | 20 | 70 | 2 |
| | | | | 10 | | | | | |

*dimethylsulfoxide
**N—methylpyrrolidone

| | Transparency | Rate of oxygen permeation (cc/m²·24 hr·atm) | Interlaminer adhesive strength | Change in appearance | |
|---|---|---|---|---|---|
| | | | | Transparency | Cracking |
| Ex. 24 | very good | 2.1 | no delamination | No | No |
| Ex. 25 | very good | 1.4 | no delamination | No | No |
| Ex. 26 | good | 25 | no delamination | No | No |
| Ex. 27 | very good | 3.5 | no delamination | No | No |
| Ex. 28 | good | 10 | no delamination | No | No |
| Ex. 29 | good | 11 | no delamination | No | No |
| Ex. 30 | very good | 7.0 | no delamination | No | No |

EXAMPLES 24 to 30

A copolymer film was formed employing a solution shown in Table 7 under a condition shown in the same Table by the procedure as similar to Example 21.

Characteristic properties of the obtained coated hollow bottle are shown in Table 7.

As to Examples 29 and 30, further on a film of the hydrolysed ethylene-vinyl acetate copolymer was provided a layer having a thickness of 2 μm of vinylidene

What we claim is:

1. A process for forming a film of a hydrolysed ethylene-vinyl acetate copolymer which comprises applying a solution of the hydrolysed ethylene-vinyl acetate copolymer dissolved in a solvent to a substrate and drying the applied substrate, said copolymer having an ethylene content of 25 to 55% by mole and a degree of hydrolysis in the vinyl acetate component of at least 90% by mole, and said solvent consisting of (A) 10 to 60% by weight of water, (B) 5 to 70% by weight of at least one member selected from the group consisting of propyl alcohol, butyl alcohol and benzyl alcohol, and (C) 2 to 85% by weight of at least one member selected from the group consisting of formic acid, an alkyl formate, acetic acid, an alkyl acetate, dimethylsulfoxide and N-methylpyrrolidone.

2. The process of claim 1, wherein said film of the hydrolysed ethylene-vinyl acetate copolymer is formed on the substrate subjected to anchor coating treatment.

3. The process of claim 2, wherein said film of the hydrolysed ethylene-vinyl acetate copolymer having a thickness of 0.5 to 10 $\mu$m is formed on an anchor coating layer having a thickness of 0.05 to 3 $\mu$m provided on a substrate having a thickness of 10 to 1000 $\mu$m.

4. The process of claim 1, wherein said copolymer is contained in the solution in an amount of 0.5 to 15% by weight.

5. The process of claim 1, wherein said solution is applied to the substrate and then the applied substrate is dried under a condition of 30° to 150° C. for a time of 3 sec to 10 min.

6. The process of claim 1, wherein said film of the hydrolysed ethylene-vinyl acetate copolymer is formed on a hollow container in the thickness satisfied with the following equations (1) and (2):

$$D_2/D_1 = 0.8 \text{ to } 1.3 \tag{1}$$

$$(D_1 + D_2)/2 = 0.5 \text{ to } 10 \tag{2}$$

wherein $D_1$ is a thickness ($\mu$m) of the copolymer film at a position of 2/3 in height of the coated area from the bottom thereof and $D_2$ is a thickness ($\mu$m) of the copolymer film at a position of $\frac{1}{3}$ in height of the coated area from the bottom thereof.

7. The process of claim 6, wherein said solution of the hydrolysed ethylene-vinyl acetate copolymer has a viscosity of 3 to 100 cP.

* * * * *